Sept. 22, 1964   W. P. SCHMITTER   3,149,499
PINION MOUNT
Filed May 16, 1961   7 Sheets-Sheet 1
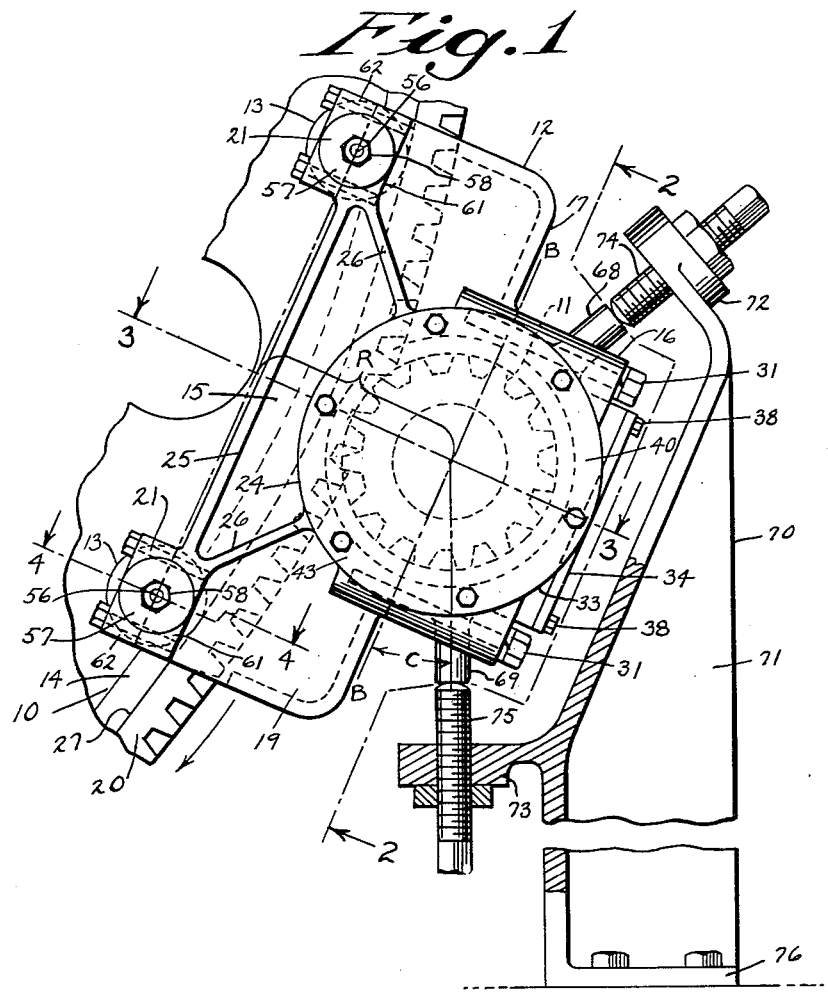
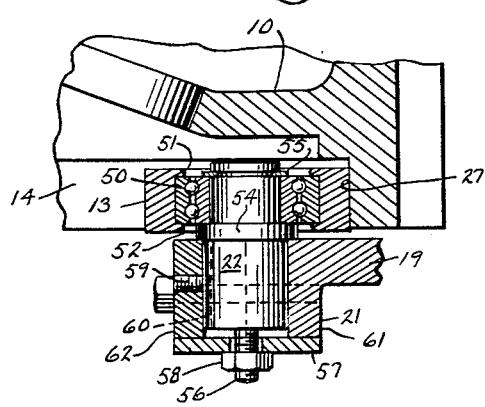
INVENTOR
WALTER P. SCHMITTER, deceased,
by A. LOUISE SCHMITTER
and ROBERT V. ABENDROTH,
CO-EXECUTORS,
BY
ATTORNEY

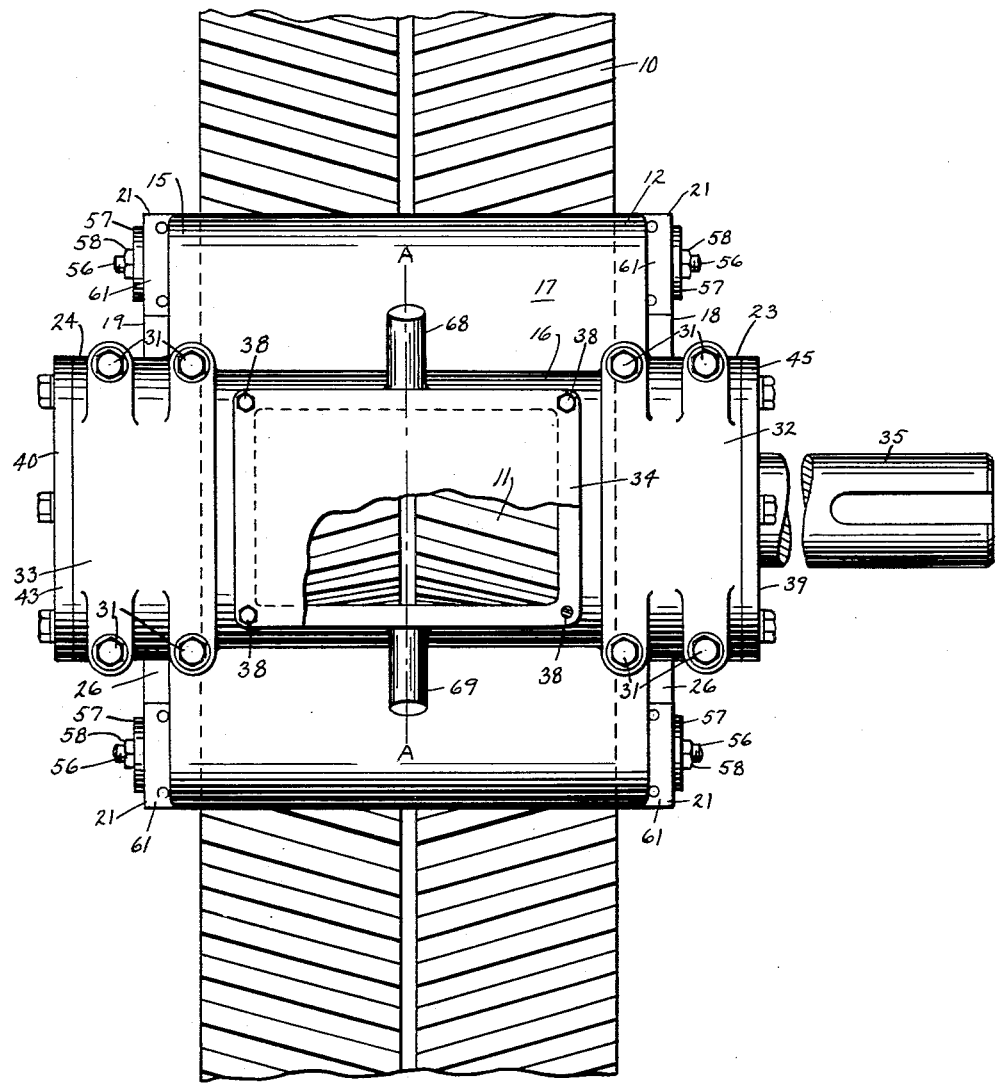

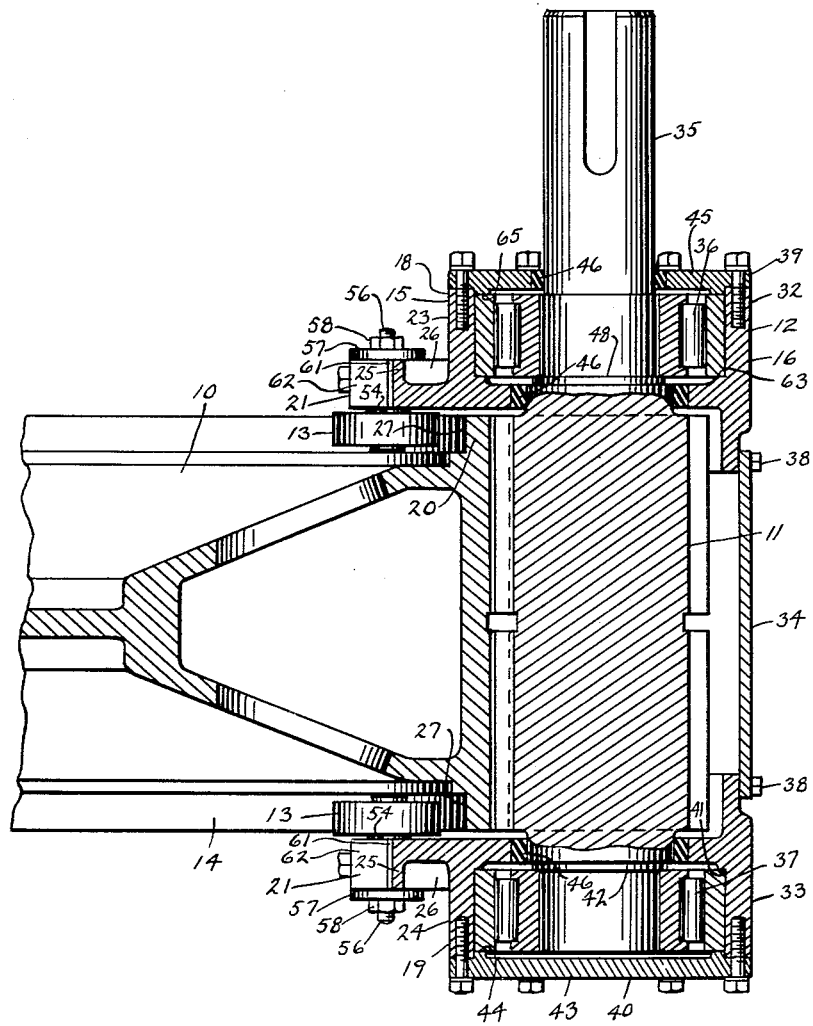

INVENTOR
WALTER P. SCHMITTER, deceased,
by A. LOUISE SCHMITTER
and ROBERT V. ABENDROTH,
CO-EXECUTORS,

BY

*Donald J. Casser*

ATTORNEY

Sept. 22, 1964 W. P. SCHMITTER 3,149,499
PINION MOUNT
Filed May 16, 1961 7 Sheets-Sheet 5

INVENTOR
WALTER P. SCHMITTER, deceased,
by A. LOUISE SCHMITTER
and ROBERT V. ABENDROTH,
CO-EXECUTORS,
BY
Donald Glasser
ATTORNEY

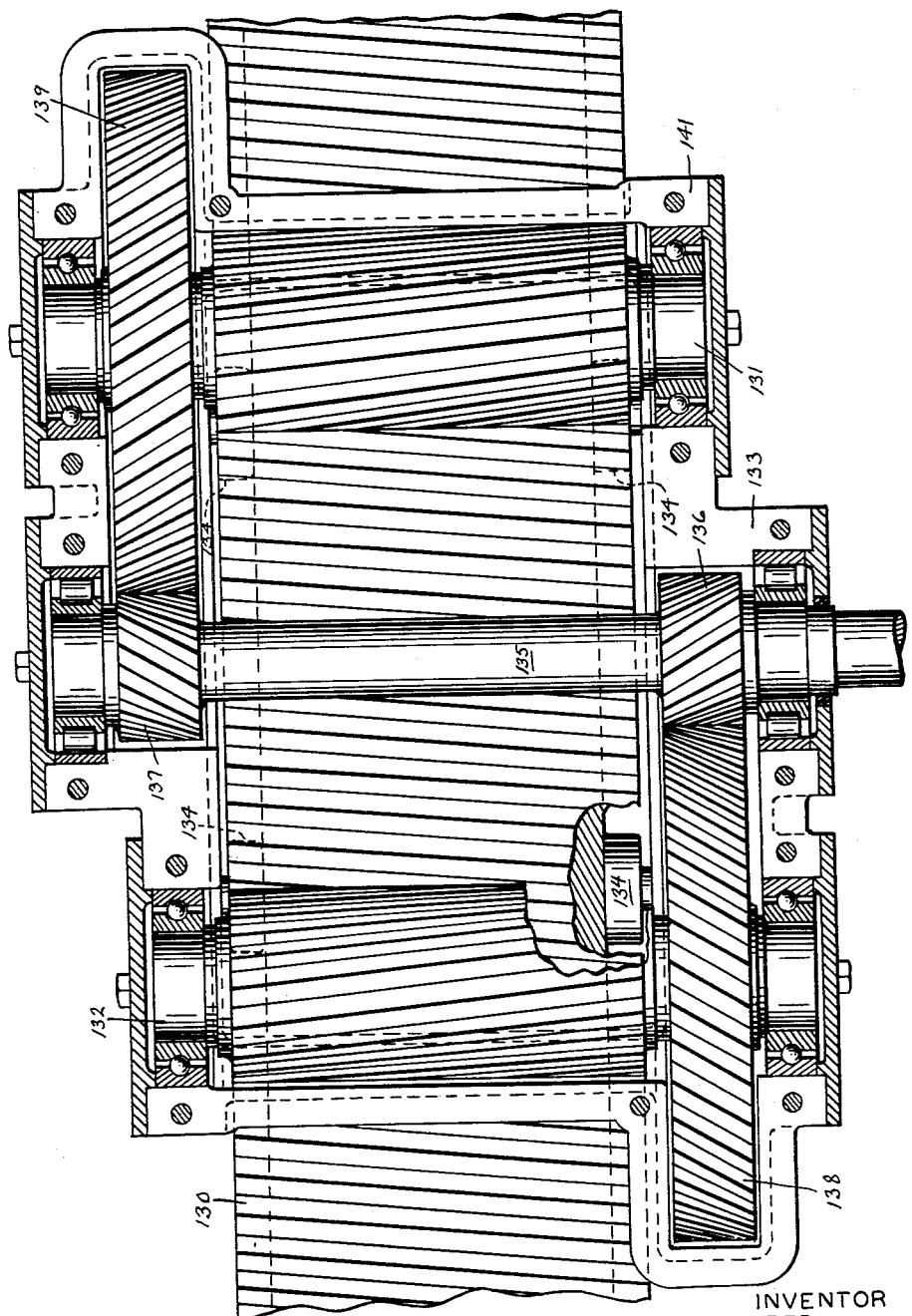

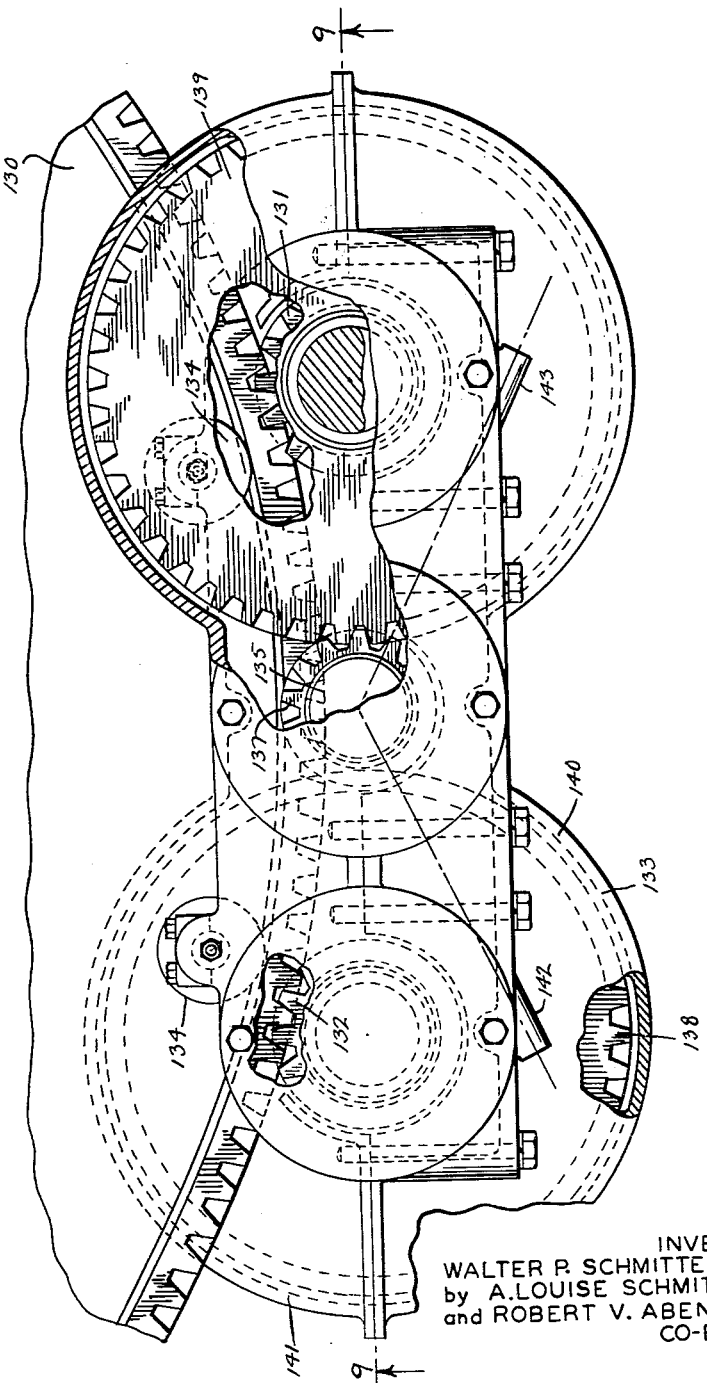

United States Patent Office 3,149,499
Patented Sept. 22, 1964

3,149,499
PINION MOUNT
Walter P. Schmitter, deceased, late of Wauwatosa, Wis., by A. Louise Schmitter and Robert V. Abendroth, co-executors, Wauwatosa and Whitefish Bay, Wis., assignors to The Falk Corporation, Milwaukee, Wis., a corporation of Wisconsin
Filed May 16, 1961, Ser. No. 110,271
7 Claims. (Cl. 74—409)

This invention relates to improvements in gear drives of the type which include a pinion intermeshing with a gear and, more particularly, to a novel pinion mount for carrying a pinion relative to the gear with which it intermeshes.

In the gear drives now utilized wherein power is transmitted from a motor to a driven machine through an intermeshed pinion and gear, it is conventional to mount the pinion on a support structure that is independent of its mating gear. Satisfactory pinion and gear wear can only be achieved by proper alignment of the pinion relative to its mating gear, which alignment is difficult to set up and maintain when the pinion is mounted separately from the gear. Misalignment caused by axial, radial, and tipping movement between the pinion and gear may arise from a number of situations, including: initial errors in the manufacture of the pinion and gear; errors in positioning of support structures when installing a gear drive; dynamic loads imposed by the driven machine which tend to separate the pinion and gear; wear of tooth surfaces; settling of support foundation structures; expansion caused by high ambient temperatures; and wear of shaft support bearings.

Accordingly, one of the principal objects of this invention is to mount a pinion relative to its mating gear in such a manner as to obviate many of the alignment difficulties inherent in known methods of supporting pinions.

Another object of this invention is to attach a pinion mount to the rim of the gear with which a pinion is to be intermeshed and thereby eliminate the need for independent support structure for the pinion and lessen the deleterious effects of changes in position of the gear and supporting structures.

A further object of this invention is to mount a pinion on the rim of its mating gear in such a fashion that proper radial and axial position of the pinion relative to the gear may be maintained to a much higher degree than heretofore possible. These and other objects will appear in the following description and claims.

In summary, this invention comprises a generally U-shaped pinion mount for a pinion that is adapted to be mounted on the rim of the gear with which the pinion intermeshes to thereby eliminate the need for independently mounted supporting structure for the pinion. The pinion mount of this invention may be adapted to carry pinions with herringbone, single-helical or spur teeth and may also be adapted to carry a divided-load pinion train.

In the description, reference is made to the accompanying drawings which form a part hereof and in which there is shown by way of illustration and not of limitation several specific forms in which this invention may be practiced.

In the drawings:

FIG. 1 is a view partly broken away and partly in section of one embodiment of the present invention for use with a pinion and gear having herringbone teeth;

FIG. 2 is a plan view of a portion of FIG. 1, taken along the plane of line 2—2 of FIG. 1;

FIG. 3 is a sectional view taken along the plane of line 3—3 of FIG. 1;

FIG. 4 is a sectional view of a portion of FIG. 1 taken along the plane of line 4—4;

FIG. 9 is a view (similar to FIG. 2) partly in section and partly broken away of a fourth embodiment of the present invention for use with a divided-load pinion train;

FIG. 10 is an end view partly in section and partly broken away of the embodiment shown in FIG. 9.

Figure 5:
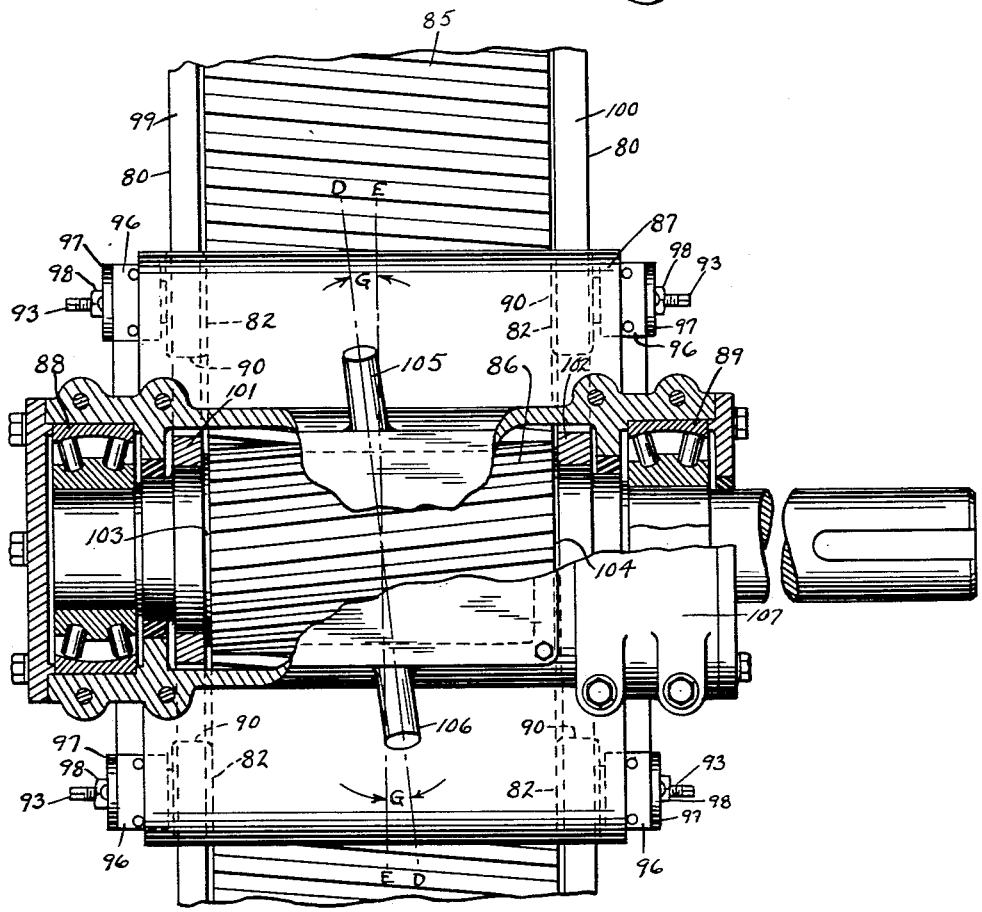
FIG. 5 is a view (similar to FIG. 2) partly in section and partly broken away of a second embodiment of the present invention for use with a pinion and gear having single-helical teeth.

In FIG. 1, there is illustrated a portion of a gear drive which includes a herringbone gear 10 intermeshed with a pinion 11 that is carried in a U-shaped pinion mount 12 constructed in accordance with this invention. As shown in FIGS. 1 and 2, the pinion mount 12 includes an axial portion which extends across the width of the rim of the gear and a pair of end portions which extend inwardly of the rim of the gear, there being an end portion at each end of the axial portion. A pair of rollers 13 are journaled onto each end portion, one roller near each inner corner thereof, so as to engage the inner surface 27 of the rim 20 of the gear. When attached to the gear in this fashion, the pinion mount 12 is supported solely by the rim of the gear, thus eliminating the need for a pinion support structure that is independent of the machine or other structure which carries the gear 10.

Turning now to a detailed description of the pinion mount 12, it is shown in FIGS. 1–3 as comprising two parts, a lower support member 15 and a cover 16, both of which may be formed as unitary castings. The lower support member 15 comprises an axial (relative to the axis of the gear 10) portion 17 that extends across the width of the rim of the gear 10 and two depending end portions 18 and 19, one on each side of the gear. The axial portion 17 is provided with a central aperture which is of sufficient size to permit proper meshing of the pinion and gear. The end portions 18 and 19 extend inwardly of the rim 20 of the gear 10 and carry rollers 13 which engage the inner surface of the rim of the gear, there being two rollers carried by each end portion with one roller attached near each inner corner thereof. A roller shaft housing 21 (FIGS. 2 and 4) may be provided at each inner corner of the end portions to receive the shafts 22 (FIG. 4) which carry the rollers 13. The end portions 18 and 19 also include bearing chambers 23 and 24, respectively, which are adapted to receive the bearings which support the pinion 11, as indicated in FIG. 3. A web 25 interconnecting the roller shaft housings 21 and a pair of webs 26 interconnecting the bearing chamber 24 with each roller shaft housing 21 may be provided on end portion 19 to strengthen the pinion mount, as shown in FIG. 1, and end portion 18 may also be provided with similar webs. The cover 16 fits over the axial portion 17 of the lower support member 15 so as to enclose the pinion which is carried within the mount, and is attached to member 15 by means of bolts 31. Bearing chambers 32 and 33 are shown as being formed as integral parts of the cover 16 along each end thereof. Bearing chamber 32 is arranged to define a cylindrical bearing enclosure 39 in conjunction with bearing chamber 23 of the support member 15 when the cover 16 is attached to the support member. Bearing chambers 33 and 24, formed as portions of the cover 16 and the lower support member 15, respectively, are arranged to define a similar bearing enclosure 40 at the other end of the mount 12 when the cover is in place. A central aperture may be cut in the cover 16 and provided with an inspection plate 34 to permit visual inspection of the pinion, the inspection plate being held in place by bolts 38.

Turning to FIG. 3, the pinion 11, which is shown as having an integral shaft portion 35, is journaled in the pinion mount in a pair of roller bearings 36 and 37 which are carried in the bearing enclosures 39 and 40 respectively. The bearings may be "shrunk" onto machined portions of the pinion along their inner race. The inward end of bearing 37 abuts an annular shoulder 41 formed as a portion of the bearing enclosure 40 and an annular shoulder 42 formed on the pinion 11. A bearing retainer plate 43 is bolted over the open end of bearing enclosure 40 and carries an annular flange 44 along its inner surface which abuts the outer end of bearing 37. In this fashion the outer race of bearing 37 is restricted against endwise movement. Bearing 36 is inserted in the bearing enclosure 39 and is held in place in a manner similar to that for bearing 37, there being annular shoulder portions 63 and 48 and flange 65 provided within the bearing enclosure 39, on the pinion 11 and along the inner surface of the bearing retainer ring 45, respectively, for this purpose. The cover 16 and lower support member 15 of the pinion mount 12 are securely bolted together when the pinion and bearings are assembled in position and each half of the bearing enclosures acts as a "clamp" to keep the bearings in place. It should be noted that the separable outer race type of roller bearings, 36 and 37, illustrated in FIG. 3 permits relative movement between their inner and outer races to thus allow a slight degree of axial "float" of the pinion, which is desirable when the pinion mount of this invention is used for herringbone gears. Three shaft seals 46 may be inserted as indicated in FIG. 3 to encircle the shaft of the pinion and thereby seal the enclosure to prevent loss of lubricant and ingress of foreign matter.

FIG. 4 illustrates in detail the manner in which the rollers 13 are attached to the end portions of the pinion mount 12. Since all four rollers are attached in a similar fashion, only one will be described. A ball bearing 50 is inserted into a central aperture in the roller 13 so that one end of the outer race abuts an annular shoulder 51 formed at the inner end of the roller. The outer end of the roller 13 may be "peened," as at 52, along the other end of the outer race of bearing 50 to complete the attachment of the ball bearing to the roller. The inner race of the bearing 50 may be "shrunk" onto a roller shaft 22 to abut an annular flange portion 54 of the roller shaft at one end, with a snap ring 55 inserted around the roller shaft at the other end of the bearing. The roller shaft 22 fits into a roller shaft housing 21 of the pinion mount and has a threaded portion 56 which projects from the housing 21. A retainer plate 57 is bolted to the housing 21 and a retainer nut 58 is screwed onto that part of the threaded portion 56 which projects from the housing and then drawn up snugly against the retainer plate so that the outer surface of the annular flange 54 abuts the inner surface of the end portion 19 of the pinion mount to thereby hold the roller shaft in place axially. A set screw 59 is threaded through the housing 21 to engage a keyway 60 formed along a central portion of the roller shaft 22 to restrict rotational movement of the roller shaft. The roller 13 is thus journaled onto shaft 22 so as to be capable of rotating while the roller shaft itself is restricted against both rotary and axial movement. The roller shaft is axially positioned so that the peripheral portion of the roller 13 will ride along a raceway 14 formed along the inner surface of the rim of the gear 10. The term "raceway" as used in the description and the claims is defined as a surface which is in contact with a movable or rotating member. In general, it is expected that a raceway will be a fairly precisely machined surface, although applications of this invention are envisioned in which raceways may be formed by other methods or even dispensed with altogether. As indicated in FIG. 1, the roller shaft housing 21 preferably comprises two parts, a portion 61 which is formed as an integral part of the pinion mount 12 and a clamp 62 which is bolted to the portion 61 when the roller shafts are inserted in position.

The pinion mount 12 thus comprises a generally U-shaped structure which is arranged to straddle the rim of a gear and carry rollers adapted to ride along raceways formed on each side of the inner surface of the rim of the gear. The pinion is then journaled in the pinion mount for driving engagement with this mating gear. A suitable power source, not shown, such as an electric motor may be connected to the pinion shaft 35, which projects from the mount 12, through a flexible shaft coupling, also not shown, to furnish the motive power for the gear drive. When mounted in this fashion, separation of the pinion and gear during operation of the gear drive will be limited by engagement of the rollers with the inner rim of the gear, thereby substantially decreasing the possibility of misalignment between the pinion and gear. The radial distance of the center line of the roller shaft 22 from the center line of the pinion 11, R in FIG. 1, will establish the amount of backlash between the gear and pinion when the rollers engage the raceway along their peripheral portions. The maximum value given to R when the mount is attached to the gear may be determined by the maximum backlash desired between the pinion and gear; the minimum value of R may be established by the minimum backlash desired between the pinion and gear, with due regard being given to the problem of the pinion teeth bottoming on the gear.

The pinion mount 12 may also be provided with reaction stops 68 and 69, which are illustrated as being formed as integral portions of the cover 16 of the pinion mount, see FIGS. 1 and 2. The reaction stops are arranged to abut a stationary reaction member 70 when the gear is rotating and thereby counteract the dynamic reaction torque forces exerted upon the pinion mount during operation of the gear and pinion so as to prevent undesired movement of the pinion mount around the gear. As shown in FIG. 1, the stationary reaction member 70 may comprise a vertical support 71 with a pair of arms 72 and 73 which carry adjustable stops 74 and 75 that are arranged to abut reaction stops 68 and 69 respectively. Reaction stop 68 and adjustable stop 74 will be in abutting relationship during clockwise rotation of the gear 10, indicated by the arrow in FIG. 1, while reaction stop 69 and adjustable stop 75 will be in abutting relationship during counterclockwise rotation of the gear. The stationary reaction member 70 may be bolted to a firm foundation along a base flange 76 as shown in FIG. 1. When the pinion mount 12 is used with a pinion and gear which have herringbone teeth as depicted in FIGS. 1-4, the reaction stops 68 and 69 are preferably selectively positioned in accordance with the pressure angle of the tooth form used for the pinion and gear. As shown in FIG. 2, the reaction stops are transversely positioned so that their center lines lie in the transverse plane A—A which bisects the face width of the pinion teeth and is normal to the pinion axis. In addition, the reaction stops are radially positioned as shown in FIG. 1, and are inclined at an angle C from the plane B—B which contains the axis of the pinion and which is perpendicular to the axial plane 3—3 that contains the two axes of the gear 10 and pinion 11. The angle C is preferably equal to the pressure angle of the gear and pinion teeth; thus if a 25° pressure angle tooth form is used, angle C may be equal to 25°.

Figure 6:
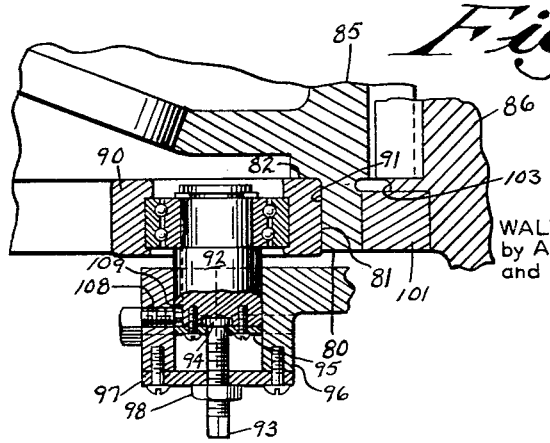
FIG. 6 is a sectional view (similar to FIG. 4) of a portion of FIG. 5.

FIGS. 5 and 6 depict a pinion mount constructed in accordance with this invention that is suitable for use with a pinion and gear which have single helical teeth instead of the herringbone teeth shown in FIGS. 1-4. The thrust forces developed during operation of single helical gearing will tend to cause axial separation and tipping of the pinion relative to the gear and, accordingly, it is preferable to adapt the pinion mount to counteract these actions. In FIG. 5 there is shown a single helical gear 85 intermeshed with a pinion 86 that is journaled in a pinion mount 87 constructed in accordance with this invention. The general construction of the pinion mount 87 is similar to that of the pinion mount 12 shown in FIGS. 1–4; consequently, only its features which differ from the pinion mount 12 will be pointed out. Due to the thrust forces developed by single helical gears, it is preferable that the pinion 86 be journaled in spherical roller bearings 88 and 89 that are adapted to withstand thrust loads. Also because of thrust forces, it is preferable that the rollers of the pinion mount 87 be adapted to restrict axial movement of the pinion. For this purpose, the rollers 90 which are attached to the pinion mount 87 are designed to engage the raceways formed along the inner surface of the rim of the gear 85 along both a peripheral portion and an end portion. This roller engagement is most clearly illustrated in FIG. 6, where the roller 90 is shown as engaging the raceway 91 formed along the inner surface of the rim 80 of the gear 85 at both its periphery 81 and its inner end portion 82. There is a similar raceway formed on both sides of the gear and all four rollers of the pinion mount preferably engage their respective raceways in a similar manner. When mounted in this fashion, it is apparent that the rollers are adapted to restrict axial movement of the pinion mount.

Because precise engagement of the rollers with the raceways is more important with the single helical gears than with herringbone gears, it is also preferable that the rollers 90 be mounted on roller shafts 92 which may be axially adjusted. For this purpose, the head 94 of a jackscrew 93 is inserted in a circular depression formed in the end of the roller shaft 92 and a retainer ring 95 bolted to the roller shaft to hold the jackscrew in place. The jackscrew projects from the roller shaft housing 96 of the pinion mount 87 and is threaded through a retainer ring 97 bolted to the housing. A retainer nut 98 is threaded over the jackscrew and drawn up tightly against the retainer ring 97. The roller shafts 92 may be restricted against rotation by means of a set screw 108 threaded through the roller shaft housing 96 so as to engage a keyway 109 formed in the roller shaft. Each roller shaft is similarly constructed and the rollers may thus be axially adjusted.

The use of means for limiting the minimum backlash between the pinion and gear is illustrated in connection with the embodiment of FIGS. 5 and 6; such means, although most generally desirable when using single helical gearing, may be incorporated in any of the embodiments of this invention described herein. For this purpose, two external raceways 99 and 100 (FIG. 5) may be machined around the exterior surface of the rim of the gear 85, one such raceway adjacent each end of the gear teeth. Rider rings 101 and 102 are provided near each end of the pinion 86 and are arranged to engage the exterior raceways 99 and 100, respectively, along their peripheral portions and thereby limit the minimum backlash between the pinion and gear. The rider rings also serve to resist the tipping forces developed with single helical gearing. The rider rings 101 and 102 may be "shrunk" onto the pinion 86 so as to abut shoulder portions 103 and 104, respectively, along their inner ends. The rider rings 101 and 102 and the outer raceways 99 and 100 thus provide minimum backlash limiting means for the pinion and gear. The embodiment illustrated in FIGS. 5 and 6 thus has a pair of inner raceways formed along the inner surface of the rim of the gear and a pair of external raceways formed along the exterior surface of the rim of the gear. During operation of the gear drive illustrated in FIGS. 5 and 6, it is expected that the dynamic torque forces will cause the rider rings to be separated from their respective raceways. The rider rings will, however, engage the raceways if the gear drive is subjected to a pulsating or cascading load (such as is commonly associated with a kiln or ball mill, for example) and thus limit the minimum backlash between the pinion and gear and prevent bottoming of the pinion. The rider rings will also prevent bottoming of the pinion teeth when the gear drive is at rest.

The reaction stops 105 and 106, shown in FIG. 5 as being formed integrally with the cover 107 of the pinion mount 87, are preferably transversely positioned in accordance with the helix angle of the gear and pinion teeth and radially positioned in accordance with the pressure angle of the teeth. The center lines of the reaction stops may lie in a plane D—D which is normal to the teeth of the pinion, as shown in FIG. 5, the plane D—D being inclined from the plane E—E which is normal to the axis of the pinion and bisects the face width of the pinion teeth at an angle G which is equal to the helix angle of the pinion and teeth. The reaction stops 105 and 106 may be radially positioned in accordance with the pressure angle of the teeth in the manner described previously for the radial positioning of reaction stops 68 and 69 shown in FIGS. 1 and 2.

Figure 7:
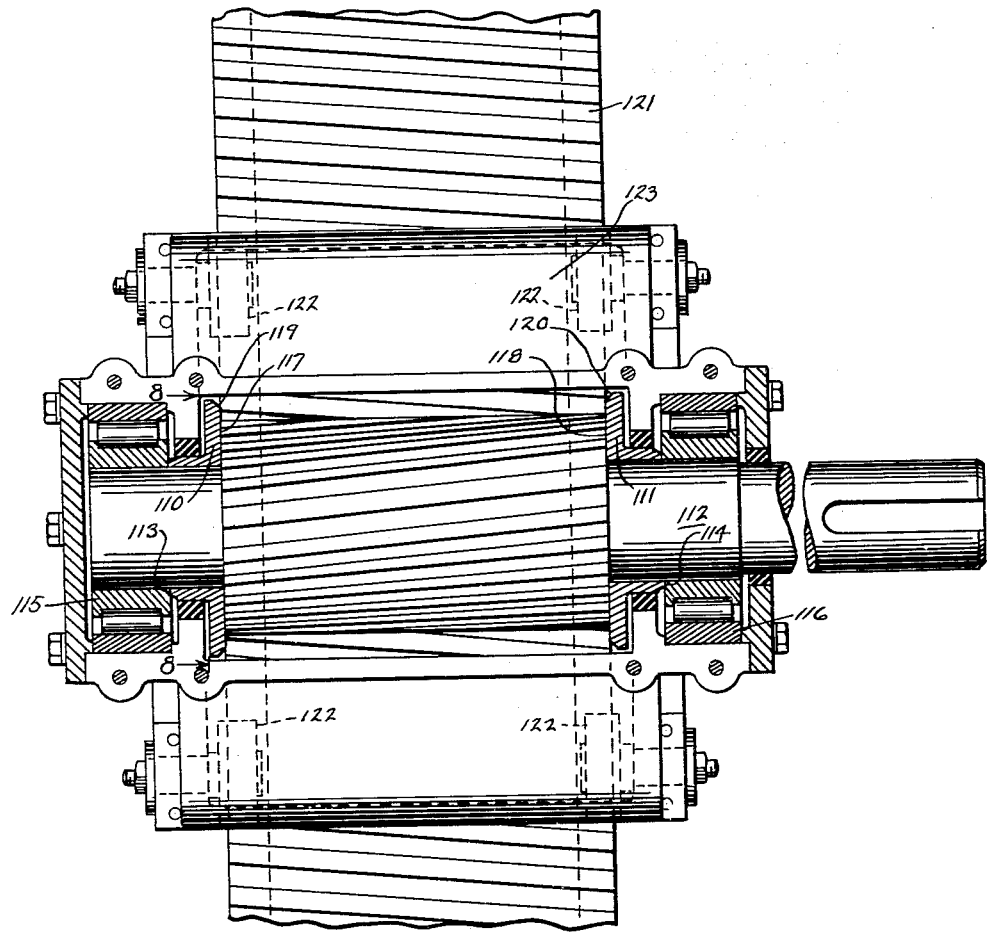
FIG. 7 is a view (similar to FIG. 2) partly in section and partly broken away of a third embodiment of the present invention for use with a pinion and gear having single helical teeth.
Figure 8:
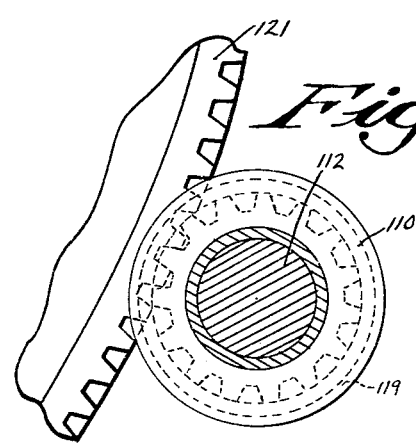
FIG. 8 is a view of a portion of FIG. 7 taken along the plane of line 8—8.

An alternate embodiment of a pinion mount constructed according to this invention that is suitable for use with single helical gears is illustrated in FIGS. 7 and 8. The most important difference between this embodiment and that of FIGS. 5 and 6 is that a pair of thrust collars are used to counteract the thrust loads developed during operation of single helical gears. For this purpose, thrust collars 110 and 111 may be "shrunk" onto the pinion 112, there being one such thrust collar at each end of the pinion teeth. The thrust collars are mounted so as to be restrained against axial movement and, for this purpose, the inner surfaces 117 and 118 of each thrust collar 110 and 111, respectively, abut the ends of the pinion teeth and the outer ends 113 and 114 of the thrust collars 110 and 111, respectively, abut the innermost ends of the bearings 115 and 116, respectively, in which the pinion is journaled. The inner surfaces 117 and 118 of the thrust collars may be beveled or crowned as at 119 and 120 along their outer edge to permit lubricant to enter between the thrust collars and the pinion sides. As indicated most clearly in FIG. 8, the thrust collars are preferably proportioned so that the inner surfaces 117 and 118 of each thrust collar contact their respective sides of the gear 121 below the tooth portion of the gear. When mounted in this fashion, the thrust collars are arranged to withstand the thrust loads developed during operation of single helical gears. The term "thrust collar" as used in this description and the claims is thus defined as a ring-like member adapted for attachment to the pinion and arranged to restrict movement of the pinion under the action of thrust forces.

The embodiment shown in FIGS. 7 and 8 is shown without the minimum backlash limiting means illustrated and described in connection with the embodiment of FIGS. 5 and 6, although such means may be incorporated in this embodiment if desired. As indicated by the dotted lines in FIG. 7, the rollers 122 by which the pinion mount 123 is attached to the gear 121 need not engage the raceways on the inner surface of the gear rim at both their peripheral and end portions in the manner shown in FIG. 6, but need only engage the raceways along their peripheral portions in the manner shown in FIG. 4. The axially adjustable roller shafts illustrated in FIG. 6 may also be omitted in this embodiment if desired, and the roller shaft structure shown in FIG. 4 used instead. Further, to permit axial freedom the bearings 115 and 116 in which the pinion 112 is journaled are preferably cylindrical roller bearings instead of spherical roller bearings as shown in FIG. 5 so that the thrust loads are restricted by the thrust collars. The remaining structural details of the embodiment shown in FIGS. 7 and 8 are similar to the embodiments previously described and, since they should be readily apparent from the drawings and the foregoing description, they will not be described in detail here.

A pinion mount constructed in accordance with this invention may also be used with gear drives which utilize spur gears. However, a specific embodiment illustrating spur gears is not included since this may be readily constructed from the description and drawings contained herein. In general, spur gears do not develop the thrust forces associated with single helical gears, and thus the pinion mount embodiment shown for herringbone gears, FIGS. 1–4, may be used in conjunction with spur gears.

The pinion mount of this invention may also be adapted to carry a divided-load pinion train which utilizes two pinions to drive the output gear with twice the capacity. This is illustrated in FIGS. 9 and 10 which shows two pinions 131 and 132 intermeshed with a gear 130. Both pinions are journaled in a pinion mount 133, constructed in accordance with this invention, which straddles the rim of the gear 130 and has four rollers 134 which engage the inner surface of the rim of the gear. An input shaft 135 is also journaled in the pinion mount 133 and may be connected to a suitable power source, not shown, to transmit the motive power for the gear drive. The input shaft is operatively connected through gearing to each pinion and may incorporate speed reduction gearing as shown in FIGS. 9 and 10. For this purpose, the input shaft 135 has two pinions 136 and 137; pinion 136 meshes with a first reduction gear 138 carried by the pinion 132 and pinion 137 meshes with the first reduction gear 139 carried by the pinion 131. If desired, pinions 136 and 137 may be integral with the input shaft 135 and gears 138 and 139 may be integral with the pinions 131 and 132 respectively, or the gears may be separate units and attached to the input shaft and pinions by conventional means. The input shaft and the two pinions are journaled in bearings which are set into suitable bearing enclosures which may be integral portions of the pinion mount 133 in the manner described above for other embodiments of this invention. The bearings for the input shaft 135 may be cylindrical roller bearings which permit axial movement between their inner and outer races, thus permitting axial "float" of the input shaft. The opposite inclination of pinion teeth 136 and 137 has the well-known effect of providing automatically balanced loading between each of the two gear trains. The axial components of forces of the pinion teeth are balanced by the free floating shaft. The bearings for the pinions 131 and 132 may be ball bearings. Other forms of bearings may be utilized with the gear drive, and those skilled in the art can readily make desired substitutions. The rollers 134, three of which are shown by dotted lines in FIG. 9, are journaled onto roller shafts carried by the pinion mount 133 in the manner previously described in connection with FIGS. 5 and 6. It is preferable that the roller shafts be axially adjustable and it is also preferable that the rollers 134 engage the raceways on the inner surface of the gear rim along both a peripheral and an end portion so as to prevent axial movement of the pinion mount 133 when it is used to carry a divided load pinion gear drive which has single helical gears as shown in FIG. 9. As illustrated in FIG. 10, the pinion mount 133 comprises a lower member 140 and a cover 141. The input shaft and both pinions, together with their interconnecting gears, are enclosed in the pinion mount and the cover is tightly bolted to the lower member to "clamp" the bearings in position. Reaction stops 142 and 143 are suitably positioned in accordance with the pressure angle and helix angle (if applicable) of the gears and pinions in the manner previously described. Other structural details shown in FIGS. 9 and 10 are similar to the other embodiments described above and, since they will be apparent from the preceding description, they will not be again described at this point. Features from the other embodiments, such as the minimum backlash limiting means shown in FIGS. 5 and 6 or the thrust collars shown in FIGS. 7 and 8 may also be incorporated in the embodiment of FIGS. 9 and 10 even though they are not specifically illustrated in the latter two figures.

Although rollers have been illustrated as the means for attaching the pinion mount to the gear in the embodiments described above, other elements including non-rotating elements may also be used for this purpose. Thus, shoes may be rockably supported on shafts carried by the pinion mount to provide sliding engagement with the rim of the gear instead of the rolling engagement provided by the rollers. In some installations, it may be feasible to dispense with the separate elements mounted on shafts carried by the pinion mount altogether and merely use a stub shaft to engage the rim of the gear and provide the means for attachment of the mount thereto. Such a stub shaft may be carried by the mount in the manner described previously in connection with the roller shafts and may have a projecting portion that would engage the rim of the gear. As another possibility, each end portion of the pinion mount may carry a projecting flange-like member, either as an integral or separate unit which would engage the inner surface of the rim of the gear for sliding engagement therewith. Those skilled in the art will be able to devise a variety of means for attaching the pinion mount to the gear and the invention is not limited to the use of rollers.

This invention thus provides a pinion mount that is adapted to counteract radial, axial and tipping movement of the pinion relative to the gear. The mount is supported solely by the rim of the gear, thereby eliminating the need for a separate pinion mounting structure that is independent of the machine or equipment to which the gear is attached. Thus the present invention eliminates many of the serious problems associated with pinion misalignment. It is contemplated that the shaft portion of the pinion shown in FIGS. 2, 5, 7 and 9 may be connected to the output shaft of a prime mover such as an electric motor through a flexible or other suitable shaft type coupling. The invention may be adapted to carry gears with any type of tooth form, including herringbone, single-helical and spur gears. In addition, it may be adapted to carry a divided-load pinion train which may also incorporate speed reduction gearing.

To demonstrate the advantages of this invention, it is now common practice to drive a mill or kiln through a gear drive comprising a ring gear which is attached to the shell of the mill or kiln and an intermeshing pinion which is supported on an independent structure. Not only is it difficult and tedious to align the independent pinion support structure when the gear drive is initially installed, but serious misalignment problems arise during operation of the mill or kiln. Thus axial movement of the ring gear, axial sag of the shell of the mill or kiln, bearing wear of the trunnions which support the shell, settling of the foundations for the equipment and wear of the ring gear itself all bring about problems of maintaining the proper alignment of the pinion relative to the gear. In addition, proper backlash is difficult to maintain in this type of installation due to the variation of backlash with high ambient temperatures and wear of trunnion bearings and the ring gear. Initial backlash may oftentimes be excessive and thereby cause vibration and an increased dynamic loading or may sometimes be inadequate and cause bottoming and tooth breakage. In addition, with a mill or kiln, the cascading of the material inside the apparatus creates dynamic forces which lead to contact disturbances between the teeth of the ring gear and the pinion. Under these conditions, it is apparent that the pinion mount of the present invention will correct and compensate for most of the deficiencies now associated with pinion supports. Because the mount is carried on the rim of the ring gear, movement or wear of the ring gear will not disturb the alignment of the pinion and gear since the mount will "float" with the ring gear. As has been described above, the pinion mount of the present invention may be adapted to prevent both excessive and inadequate backlash between the pinion and gear. The mount of the present invention is capable of resisting the separatory forces which tend to radially separate the pinion and the gear, thrust forces which tend to axially separate the pinion and the gear and also tipping moments which tend to tip the axis of a pinion relative to the gear.

Although several embodiments of this invention have been described and illustrated herein, it is expected that those skilled in the art will be able to devise other embodiments and still remain within the scope of the present invention as defined in the claims.

The invention claimed is:

1. In a gear drive comprising a single helical pinion intermeshed with a single helical continually rotatable circular gear of the type which has a circumferential rim portion that carries the gear teeth, the improvement comprising a generally U-shaped pinion mount in which said pinion is journaled, said pinion mount including an axial portion which extends across the width of the rim of the gear and an end portion at each end of the axial portion arranged to extend inwardly of the rim of the gear, with one end portion on each side of the gear; rollers journaled in each end portion that engage the inner surface of the rim of the gear; a pair of external raceways formed on the exterior surface of the rim of the gear, with one external raceway along each end of the gear teeth; and a pair of rider rings mounted on the pinion to engage the external raceways, one such rider ring engaging one of the external raceways and the other rider ring engaging the other external raceway.

2. In a gear drive comprising a single helical pinion intermeshing with a single helical continually rotatable circular gear of the type which has a circumferential rim portion which carries the gear teeth, the improvement comprising a generally U-shaped pinion mount in which said pinion is journaled, said pinion mount including an axial portion which extends across the width of the rim of the gear and an end portion at each end of the axial portion arranged to extend inwardly of the rim of the gear; a pair of inner raceways on the inner surface of the rim of the gear, there being one such inner raceway near each end of the gear teeth; a pair of rollers journaled onto each end portion, one pair of rollers to engage one of the inner raceways and the other pair of rollers to engage the other inner raceway; a pair of external raceways formed on the exterior surface of the rim of the gear, with one raceway near each end of the gear teeth; and a pair of rider rings mounted on the pinion so that one rider ring engages one such external raceway and the other the second external raceway.

3. The apparatus of claim 2 wherein said rollers are journaled on axially adjustable shafts supported by said end portions.

4. The apparatus of claim 2 wherein said rollers engage the inner raceways along a peripheral portion and along an end portion so as to restrict both axial and radial movement of the pinion mount.

5. The apparatus of claim 4 wherein said rollers are journaled on axially adjustable shafts supported by said end portions.

6. In a gear drive comprising a single helical pinion intermeshed with a single helical continually rotatable circular gear of the type which has a circumferential rim portion that carries the gear teeth, the improvement comprising a generally U-shaped pinion mount in which said pinion is journaled, said pinion mount including an axial portion which extends across the width of the rim of the gear and a pair of end portions that extend inwardly of the rim of the gear with one such end portion at each end of the axial portion; rollers journaled in each end portion to engage the inner surface of the rim of the gear; and a pair of thrust collars attached to the pinion with one thrust collar at each end of the pinion teeth, said thrust collars being further arranged to contact the side surfaces of the gear during operation of the gear drive.

7. In a gear drive comprising a continually rotatable circular gear of the type which has a circumferential rim portion that carries the gear teeth and a pinion train of the type which has an input shaft operatively connected through gearing to two pinions that mesh with the aforesaid gear teeth, the improvement comprising a generally U-shaped pinion mount for the pinion train, said pinion mount having an axial portion which extends across the width of the rim of the gear and end portions which extend inwardly of the rim of the gear, with one end portion on each side of the gear; means for attaching the pinion mount to the rim of the gear comprising rollers journaled onto axially adjustable roller shafts supported by said mount so as to engage the inner surface of the rim of the gear, there being at least a pair of such rollers journaled on each end portion of said mount with each roller positioned to engage the inner surface of the rim of the gear along both an end portion and a peripheral portion.

References Cited in the file of this patent

UNITED STATES PATENTS

| | | |
|---|---|---|
| 294,819 | Speers | Mar. 11, 1884 |
| 710,920 | Morgan | Oct. 7, 1902 |
| 2,399,360 | Lacey | Apr. 30, 1946 |
| 2,509,161 | Meyers | May 23, 1950 |